Figure 1:
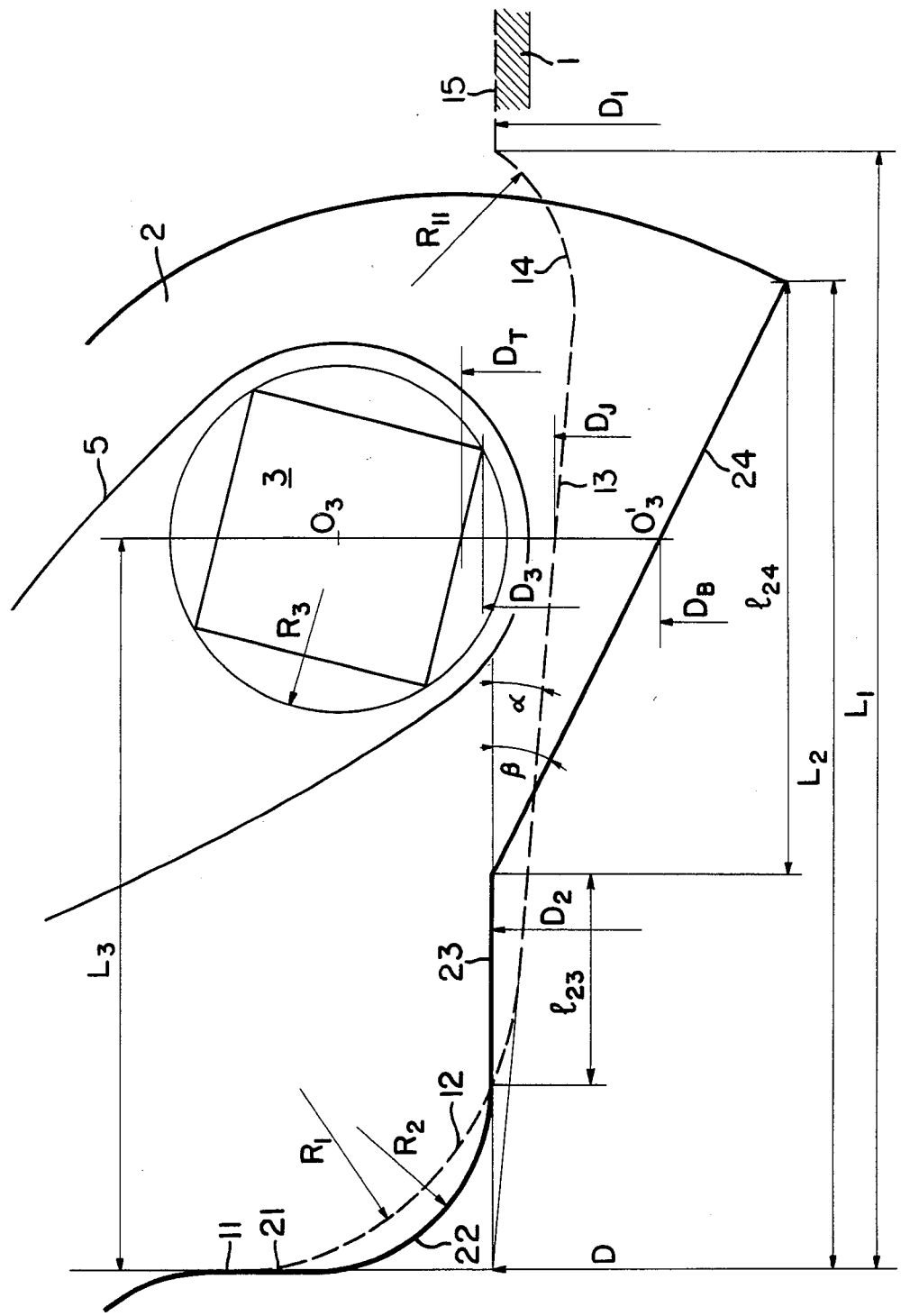

United States Patent [19]

Pompier

[11] Patent Number: 4,554,960
[45] Date of Patent: Nov. 26, 1985

[54] RADIAL CARCASS TIRE WHICH CAN BE PARTICULARLY USED WITHOUT AN INDEPENDENT INNER TUBE

[75] Inventor: Jean-Pierre Pompier, Enval, France

[73] Assignee: Compagnie Generale des Etablissments Michelin, Clermont-Ferrand, France

[21] Appl. No.: 606,753

[22] Filed: May 3, 1984

[30] Foreign Application Priority Data

Jun. 23, 1983 [FR] France .................................. 83 10543

[51] Int. Cl.$^4$ ....................... B60C 15/02; B60C 15/00
[52] U.S. Cl. .............................. 152/450; 152/DIG. 9
[58] Field of Search ...... 152/362 R, 362 CS, DIG. 9, 152/DIG. 17

[56] References Cited

U.S. PATENT DOCUMENTS

| | | | |
|---|---|---|---|
| 3,302,681 | 2/1967 | Travers | 152/362 R |
| 3,524,490 | 8/1970 | Verdier | 152/362 R |
| 3,736,974 | 6/1973 | Lejeune | 152/362 R |
| 3,949,800 | 4/1976 | Lejeune | 152/362 R |
| 4,096,900 | 6/1978 | Olsen | 152/354 R |
| 4,148,348 | 4/1979 | French et al. | 152/362 R |
| 4,207,940 | 6/1980 | Roger | 152/362 R |
| 4,434,831 | 3/1984 | Uemura | 152/362 CS |

FOREIGN PATENT DOCUMENTS

| | | | |
|---|---|---|---|
| 860151 | 12/1952 | Fed. Rep. of Germany | 152/362 R |
| 2425743 | 12/1975 | Fed. Rep. of Germany | 152/362 R |
| 1127632 | 12/1956 | France . | |
| 1536469 | 8/1968 | France . | |
| 2275323 | 1/1976 | France . | |
| 2429111 | 1/1980 | France . | |
| 1480917 | 7/1977 | United Kingdom . | |
| 2016385 | 9/1979 | United Kingdom . | |

OTHER PUBLICATIONS

V. N. Laptev et al., "Design Aspects of the Bead Zone of Radial-Ply Tractor Tyres", Int. Polymer Sc. & Tech., vol. 3, No. 1, pp. T/73–T/74 (1976).

Primary Examiner—Lois E. Boland
Attorney, Agent, or Firm—Brumbaugh, Graves, Donohue & Raymond

[57] ABSTRACT

A tire which can be used without an inner tube on a standard "safety" rim, each of the beads of which tire has, on the one hand, a base of a width $L_2$, comprising essentially a cylindrical zone of diameter $D_2$, equal to the diameter $D_1$ of the cylindrical hump of the rim and having an axial width $l_{23}$ which is between 0.15 $L_2$ and 0.25 $L_2$, and a frustoconical zone of an axial width $l_{24}$ which is between 0.45 $L_2$ and 0.65 $L_2$, the generatrix of the frustoconical zone forming with the axis of rotation of the tire an angle $\beta$ such that tan $\beta$ is between 0.5 and 0.6, and, on the other hand, a reinforcing bead ring of an interior diameter $D_3$ which is very little different from $D_1$, the center $O_3$ of a circle circumscribed around the cross section thereof being located at a distance $L_3$ from the rim flange such that the clamp on the rim is at least equal to 0.45.

6 Claims, 3 Drawing Figures

RADIAL CARCASS TIRE WHICH CAN BE PARTICULARLY USED WITHOUT AN INDEPENDENT INNER TUBE

The present invention concerns tires for light vehicles which do not have an independent inner tube and are provided with a radial carcass reinforcement and with a crown reinforcement formed of at least two plies of cables or wires parallel in each ply and crossed from one ply to the next. More particularly, the invention concerns the beads of such tires, which are provided with at least one substantially inextensible annular reinforcement which makes it possible to anchor the carcass reinforcement by wrapping.

For reasons of safety, the tires in question are mounted on corresponding rims the shape and dimensions of which are at present standardized (ETRTO Standards, for instance).

These rims are characterized by the fact that they are provided, at least on the outer side of the vehicle between the circumferential groove known as the well base and the frustoconical bead seat, with a circumferential hump which has a horizontal contour in radial section, hence the name "flat hump." This cyclindrical hump generally has a diameter equal to or slightly greater than the nominal diameter of the rim.

The beads of tubeless tires which are intended to be mounted on these rims have a base of an axial width slightly less than the axial distance between the inner vertical wall of the rim flange and the axially outer edge of the cylindrical hump.

After the molding of the tire in the vulcanization mold, this base is essentially in the form of a frustoconical surface so that the diameter of the tire bead, measured at the intersection between the generatrix of the frustoconical surface and the vertical wall of the tire bead is slightly less than the nominal diameter of the rim, the difference between these diameters being on the order of 0.3% of the nominal diameter of the rim.

The annular reinforcement or bead ring which may, seen in radial section, be of different shape and dimensions, is then located axially and radially approximately at the center of the mass of the elastomer filling material of the bead.

Such a construction permits correct mounting of the beads on the corresponding seats of the rim under the effect of the air pressure introduced into the tire upon inflation, as well as the sealing of the inner cavity of the tire. The high pressure obtained between the two surfaces by compressive deformation of the elastomer material assures a firm position of the bead despite the normal mechanical stresses to which it is subjected in case of correct inflation pressure, that is to say a pressure equal to or very little different from the inflation pressure recommended in the known standards and by the manufacturers, depending on the size used and the load supported by the tire.

With the continuing improvement in the stability of vehicles and the possibility of higher and higher speeds around curves, the known means have become at times insufficient to hold the tire beads in place on their rim seats under all circumstances, and more particularly in the case of tires having radial carcass reinforcement and no inner tube.

Under the combined effect of the many forces present between the surface of contact of the tire with the ground and the no fewer moments of forces affecting the wheel, substantial stresses are imposed on the tire beads and in particular the reinforcing bead rings.

In the event of a substantial loss of inflation pressure when traveling on a curved path of small radius, these stresses, despite the hump of the rim, cause displacement towards the well base of this rim of the bead which is furthest from the center of the curved path. This phenomenon becomes particularly serious in the case of so-called "front drive" vehicles; control of the steering is lost, resulting in accidents when traveling at high speed over curved paths of small radius (narrow curves, fast overtaking).

When traveling with normal or underinflated pressure, these stresses are directly responsible for the loss by fatigue of the initial properties of the vulcanized products in the vicinity of the bead ring, and, in particular, of the vulcanized products located radially between the base of the bead and a line parallel to said base passing through the outer point of the contour of the bead ring closest to the axis of rotation of the tire. The result is that these vulcanized products, after a certain number of revolutions of the tire, are no longer capable of fulfilling their original functions and it is no longer necessary for there to be substantial stresses in order to lead to losses in the seal and displacements of the beads towards the well base of the rim.

In order to prevent such incidents or accidents when traveling under extreme conditions (sudden loss of pressure), numerous solutions have been proposed.

The vast majority of them concern tire-rim combinations with changes both in the tire and in the rim.

These arrangements have the major drawback that it is not possible to dissociate tire and rim in their use nor to use conventional solid rims with hump.

Other solutions directed at this same purpose but which do not require modification of the standard conventional rims are known. For example, French Pat. No. 1,536,469 imparts to the beads of the tire a better seat on the rim seats by imparting to the radially inner surface of the bead an angle with respect to the axis of rotation of the tire which is greater than the angle of the corresponding frustoconical surface of the mounting rim. Due to the combination of this means with a decrease in the diameter of the bead as compared with the nominal diameter of the rim, the inflation pressure below which the tire leaves its position on the rim seat is substantially decreased.

Under severe conditions of travel, such an arrangement, in order to be satisfactory, requires an excessive clamp which becomes incompatible with a correct positioning of the beads of the tire on the rim.

French Pat. No. 2,429,111 discloses a tire mounted on a rim of the hump type, in which the beads are provided with an annular reinforcement of elastomer radially inwards of the base of the bead of the tire. A greater drop in pressure is thus avoided upon movement of the tire bead, thus preventing impromptu axial displacement of the tire on its rim.

In addition to the difficulties in mounting such a tire and in the event a drop in pressure takes place for other reasons, the solution proposed is incompatible with maintaining the bead on the rim.

The problem which forms the basis of the present invention is to remedy these drawbacks by assuring at all times the easy and precise placing of the beads on the rim seats under the effect of the inflation pressure, the sealing of the inner cavity of the tire and by assuring the holding of the beads on the rim seats down to an inflation pressure definitely less than that below which a conventional bead customarily is displaced.

For this purpose, the tire of the present invention is characterized by the fact that it is provided, on both sides of its equatorial plane, with a bead which has the following features, in combination:

(a) seen in radial section from the equatorial plane towards the outside of the tire, the base of the bead is composed essentially;

of a frustoconical zone, the generatrix of which forms with the axis of rotation of the tire an angle which opens towards the inside of the tire and is of a value such that the value of its tangent is between 0.5 and 0.6, the axial width of this generatrix being between 45% and 65% of the total width of the bead;

located against this frustoconical zone, of a cylindrical zone, the radius of which with respect to the axis of rotation of the tire is equal to the radius of the cylindrical hump or flat hump of the tire and the axial width of which is at least equal to 15% of the total width of the bead, and preferably between 15% and 25% of said width, and of a connecting zone between the cylindrical zone and the vertical wall of the bead;

(b) the annular reinforcing ring has, along a section of the tire through a radial plane passing through the axis of rotation of the tire:

on the one hand, an interior diameter, perpendicular to the axis of rotation of the tire, at least equal to the diameter of the cylindrical hump of the rim and at most equal to 1.004 times said diameter, on the other hand, a cross-section of any shape, the circumscribed circle of which has its center located, axially with respect to the vertical wall of the bead, at a distance away such that the ratio $$s = \frac{D_J - D_B}{D_T - D_B}$$

is at least equal to 0.45, $D_J$ being the diameter of the rim measured in a plane parallel to the equatorial plane of the tire and passing through said center, $D_B$ being the diameter of the bead base along the same plane, $D_T$ being the interior diameter of the bead ring along the same plane.

Preferably in accordance with the invention, the bead ring is such that its circumscribed circle has a radius at most equal to 0.72 times the radius of the circular arc connecting the generatrix of the frustoconical bead seat of the rim to the generatrix of the cylindrical flat hump of the rim.

It is furthermore preferable that the cross section of the bead ring be circular which, for the preferred maximum radius, permits the largest mass of material, preferably steel.

Still in accordance with the invention there may advantageously be added, tangent to the circular principal bead ring, a second bead ring of circular cross section which is located radially and axially towards the outside of the tire.

The center and the diameter of its circular section are chosen in such a manner that the projection of its center onto the base of the bead is located on the generatrix of the cylindrical zone of the base of the bead.

This second bead ring permits a more precise centering of the principal bead ring upon the vulcanization of the tire and in no way interferes with the placing of the tire in position on its rim.

The rigidity of the tip of the bead, which tip is radially and axially to the inside of the principal bead ring, is preferably increased by the use of a vulcanized product of high modulus of elasticity.

A reinforcement layer can extend, in whole or in part, along the contour of the tip of the bead and may be formed, as known per se, of one or more plies of wire, for example, textile.

The zone of connection between the cylindrical zone of the base of the bead and the vertical wall of the bead may be circular but may preferably be in frustoconical shape, the generatrix of this surface then forming with the axis of rotation of the tire an angle which opens towards the inside of the tire and amounts to between 45° and 70°, and preferably an angle equal to 60°±5° which is very close to the angle which the axially inner wall connecting the flat portions of the hump and of the well base makes with the axis of rotation of the tire.

Figure 2:
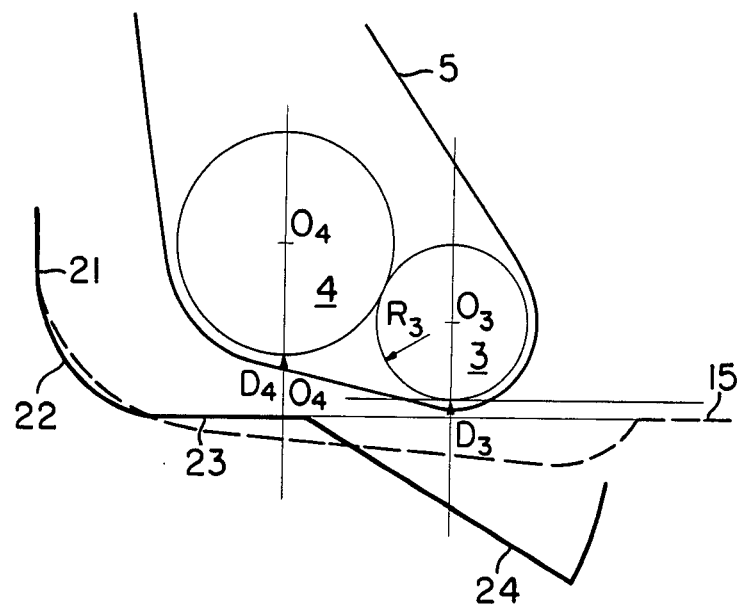
Figure 3:
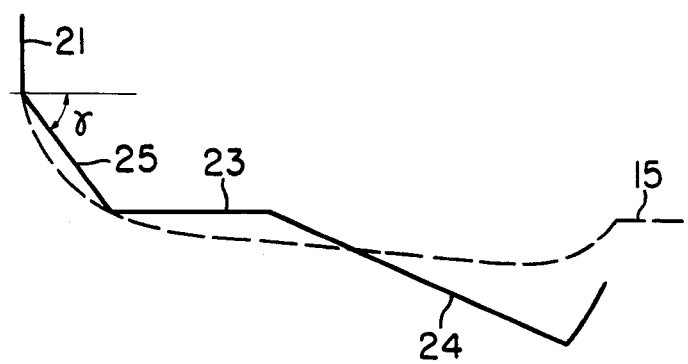

Examples of embodiments in accordance with the invention are described below with reference to the accompanying drawing, in which:

FIG. 1 is a sectional view in a radial plane passing through the axis of rotation of the tire, of a bead of this tire, not mounted or inflated, showing on a large scale the outer contour (in solid line) of this bead as compared with the contour (in dash line) of the base of a standard 390×150 TR FH rim, and showing (also in solid line) the position of the principal bead ring with respect to these two contours;

FIG. 2 is a view in radial section of a preferred embodiment having two bead rings of circular section; and FIG. 3 shows a preferred solution in which the connecting zone between the vertical wall of the bead and the cylindrical zone of the bead is a frustoconical zone.

In FIG. 1 the dash line indicates the contour of a standard rim 1 (390×150 TR FH) used in accordance with the invention, with the inner vertical wall 11 of its flange, a circular arc 12 of radius $R_1$ of at most 6 mm connecting the inner vertical wall 11 to the generatrix 13 of the frustoconical bead seat. The generatrix 13 makes a theoretical angle $\alpha$ of 5° with a line parallel to the axis of rotation of the tire and is connected to the generatrix 15 of the cylindrical hump of the rim 1 by a circular arc 14 of radius $R_{11}$ having a value of 3.5 mm. The axial distance $L_1$ between the inner vertical wall 11 of the flange and the starting point of the cylindrical hump is 203 mm. The diameter $D_1$ of the cylindrical hump is equal to the nominal diameter D of the rim 1, measured at the intersection of the generatrix 13 and of the inner vertical wall 11.

As compared with this rim contour, in accordance with the present invention the bead 2 of the tire has a base whose contour, shown in solid line, consists of a vertical wall 21, a circular arc 22, and two generatrices 23 and 24.

The vertical wall 21 is at the same axial distance from the equatorial plane of the tire as the inner vertical wall 11 of the rim flange. The generatrix 23 of the cylindrical zone is connected to the vertical wall 21 by a circular arc 22 of radius $R_2$. This generatrix 23 has an axial width $l_{23}$ of 36 mm, equal to 20% of the axial width $L_2$ of the bead 2, which is 180 mm. The diameter $D_2$ of this cylindrical zone is equal to the diameter $D_1$ of the cylindrical hump or flat hump of the rim 1. Adjoining the generatrix 23, the generatrix 24 of the frustoconical zone of the bead 2 forms with the axis of rotation of the tire an angle β of 27° (tangent β=0.5095) and has an axial width l$_{24}$ of 108 mm, equal to 0.60 times the width L$_2$.

In this example, the bead 2 of the tire has a bead ring 3 of square cross section around which the carcass ply reinforcement, represented by its central line 5, is wrapped.

The circle circumscribed around the polygonal cross section of the bead ring 3 has, in accordance with the present invention, a radius R$_3$ of 3.125 mm and a center O$_3$ whose projection O'$_3$ on the base of the bead 2 is located on the generatrix 24 of the frustoconical zone at an axial distance L$_3$ of 133 mm from the vertical wall 21 of the bead 2.

The interior diameter D$_3$ of the bead ring 3, measured between the two points of this bead ring 3 which are closest radially to the axis of rotation of the tire, is 391 mm, equal to 1.0026 times the diameter D$_1$ of the cylindrical hump of the rim 1.

If the ratio s as defined above:

$$s = \frac{D_J - D_B}{D_T - D_B}$$

is referred to as the clamp on the rim, measurement on the diagram gives s=0.53. This value, which in first approximation measures the deformation by compression imposed on the elastomer material located below the bead ring is large as compared with the clamp normally used in an ordinary tire, which generally does not exceed 0.30. A higher value, as a matter of fact, makes the mounting of an ordinary bead practically impossible.

The tests carried out by the applicant have made it possible to establish that, when the tire is inflated, the guidance of the bead on the rim is precise as a result of the presence of two concentric cylindrical surfaces of equal diameter and therefore, as the compression of the elastomeric mass below the bead ring is circumferentially uniform, the placing of the bead on its bead seat proves to be very easy despite the extensive clamp (compression). The position of the bead ring definitely spaced from the vertical wall of the bead and of the rim, as a result of the extensive clamp (compression) obtained and the blocking of the bead ring by the circular wall of the hump, confers improved stability on the bead.

Thus, the 180-65.390 tire described above, under a load of 350 kg, has a pressure below which the bead shifts axially towards the rim base equal to 0.6 bar, while this pressure was 1 bar in the case of the control tire. The test consists in driving a vehicle at a speed of 50 km/hr on a track having a clothoid-shaped contour, the radius of curvature of the mean trajectory of which changes progressively from infinity to 20 m. At the end of the trajectory, the driver subjects the vehicle to accelerations or decelerations in order to confirm the value obtained.

Furthermore, as the rubber movements are reduced below the bead ring whatever the stresses to which the bead is subjected, whether axial, circumferential or radial, there is obtained, upon travel under normal pressure or a pressure greater than 0.6 bar, a better fatigue life of the vulcanized products adjacent to the reinforcing bead ring and in particular of the rubber tip. This permits the bead of the present invention to retain the major part of its initial properties and to thus have the same advantages for the entire life of the tire.

FIG. 2 shows a bead according to the present invention which has a principal bead ring 3 and a complementary bead ring 4. The two bead rings are of circular cross section. The bead ring 4, which is tangent to the principal bead ring 3, has its center O$_4$ so located that its projection O'$_4$ on the base of the bead is located on the generatrix of the cylindrical zone 23. As can be noted, the clamp of this bead ring is then zero. Intended to assure a better positioning of the principal bead ring 3 upon the vulcanization of the tire, it however makes it possible to reduce to 0.4 bar the pressure below which the bead shifts from its rim seat.

FIG. 3 shows a zone of connection between the vertical wall 21 and the generatrix 23 of the cylindrical zone which is of frustoconical shape. The generatrix 25 forms an angle γ of 55° with the axis of rotation of the tire, this angle γ being close to the angle formed by the axially inner wall of the cylindrical hump, which connects the generatrix 15 to the rim bottom (not shown). This preferred means permits better guidance of the bead upon the mounting of the tire on its rim.

What is claimed is:

1. A tire without an independent inner tube, having a radial carcass reinforcement, a crown reinforcement formed of at least two plies of cables which are parallel in each ply and crossed from one ply to the next, and two beads each reinforced by at least one bead ring around which the carcass reinforcement is anchored, which can be mounted on a standard rim provided, between the well base and the frustoconical bead seat, with a circumferential hump having radially a cylindrical generatrix, characterized by the fact that, on the one hand, the base of the beads, of an axial width L$_2$, has, seen in radial section and from the equatorial plane towards the outside of the tire, a profile comprising a frustoconical zone having an axial width l$_{24}$ of between 0.45 L$_2$ and 0.65 L$_2$, the generatrix of which forms with the axis of rotation of the tire an angle β such that the value of the tangent of the angle β is between 0.5 and 0.6; a cylindrical zone having an axial width l$_{23}$ of between 0.15 L$_2$ and 0.25 L$_2$ and having a diameter D$_2$ equal to the diameter D$_1$ of the cylindrical hump of the rim; and a circular arc connecting zone between the cylindrical zone and the vertical wall of the bead;

and on the other hand, the reinforcing bead ring, seen in radial section, has an interior diameter D$_3$ at least equal to the diameter D$_1$ of the cylindrical hump of the rim but at most equal to 1.004 times said diameter, and a cross section, the circumscribed circle of which has its center located, axially with respect to the vertical wall of the bead, at a distance away L$_3$ such that the ratio $$s = \frac{D_J - D_B}{D_T - D_B}$$

is at least equal to 0.45, D$_J$, D$_B$, D$_T$ being the diameter of the rim, the diameter of the base of the bead and the diameter of the bead ring, respectively, measured in a plane parallel to the equatorial plane of the tire and passing through said center.

2. A tire according to claim 1, characterized by the fact that the circle circumscribed around the reinforcing bead ring has a radius $R_3$ at most equal to 0.72 times the radius $R_{11}$ of the circular arc connecting the generatrix of the frustoconical bead seat of the rim with the generatrix of the cylindrical hump of the rim.

3. A tire according to claim 1, characterized by the fact that the reinforcing bead ring has a circular cross section.

4. A tire according to claim 3, characterized by the fact that the bead comprises a second bead ring of circular cross section which is tangent to the principal bead ring and the interior diameter $D_4$ of which is greater than the interior diameter $D_3$ of the principal bead ring and the center of the cross section of which has a projection on the base of the bead which is located on the generatrix of the cylindrical zone of the base of the bead.

5. A tire according to any one of claims 1 to 4, characterized by the fact that the circular arc is replaced by the generatrix of a frustoconical zone, said generatrix forming with the axis of rotation of the tire an angle $\gamma$ of between 45° and 75°.

6. A tire according to claim 5, characterized by the fact that said angle $\gamma$ is equal to 60°±5°.

* * * * *